(12) United States Patent
Akiyama et al.

(10) Patent No.: US 9,333,723 B2
(45) Date of Patent: May 10, 2016

(54) ADHESIVE COMPOSITION

(75) Inventors: Hiroko Akiyama, Kanagawa-pref. (JP); Yorinobu Takamatsu, Sagamihara (JP); Yoshiteru Kakinuma, Tokyo (JP)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 751 days.

(21) Appl. No.: 13/581,750

(22) PCT Filed: Mar. 4, 2011

(86) PCT No.: PCT/US2011/027114
§ 371 (c)(1),
(2), (4) Date: Aug. 29, 2012

(87) PCT Pub. No.: WO2011/109672
PCT Pub. Date: Sep. 9, 2011

(65) Prior Publication Data
US 2013/0260137 A1    Oct. 3, 2013

(30) Foreign Application Priority Data
Mar. 5, 2010  (JP) .................................. 2010-048605

(51) Int. Cl.
*B32B 5/16* (2006.01)
*C09J 133/06* (2006.01)
*C09J 133/02* (2006.01)

(52) U.S. Cl.
CPC .................. *B32B 5/16* (2013.01); *C09J 133/02* (2013.01); *C09J 133/06* (2013.01); *C09J 133/066* (2013.01); *Y10T 428/254* (2015.01); *Y10T 428/2982* (2015.01)

(58) Field of Classification Search
None
See application file for complete search history.

(56) References Cited

U.S. PATENT DOCUMENTS

| | | |
|---|---|---|
| 3,645,835 A | 2/1972 | Hodgson |
| 4,595,001 A | 6/1986 | Potter |
| 5,543,151 A | 8/1996 | Shirai |
| 5,785,985 A | 7/1998 | Czech |
| 2011/0237725 A1* | 9/2011 | Clapper et al. ................ 524/271 |

FOREIGN PATENT DOCUMENTS

| | | |
|---|---|---|
| JP | 2539330 | 10/1996 |
| JP | H09-324164 | 12/1997 |
| JP | 2700835 | 1/1998 |
| JP | H10-500328 | 1/1998 |
| JP | H10-508520 | 8/1998 |
| JP | 2003503538 | 1/2003 |
| JP | 2004137313 A | 5/2004 |
| JP | 2008001679 | 1/2008 |
| WO | WO 95/31224 | 11/1995 |
| WO | WO 96/14094 | 5/1996 |
| WO | WO 00/78883 | 12/2000 |
| WO | WO 02/055626 | 7/2002 |
| WO | WO 2009/145856 | 12/2009 |

OTHER PUBLICATIONS

Tanaka, Masato. *Polymer Particle Diameter Control in Suspension Polymerization*. Tokyo: IPC K.K., 1993. Chapters 2-3. Print.
PCT International Search Report for PCT/US2011/027114 mailed May 26, 2011.

* cited by examiner

*Primary Examiner* — Sheeba Ahmed
(74) *Attorney, Agent, or Firm* — 3M Innovative Properties Company; Lynn R. Hunsberger

(57) ABSTRACT

An adhesive composition is disclosed that comprises acrylic adhesive particles having an average diameter of 10 to 100 micrometers obtained by suspension polymerization of an acrylic monomer mixture which comprises a branched C 14-22 alkyl group containing (meth)acrylate and a polar monomer. The adhesive composition may be applied to an adhesive dressing or patch. The adhesive has excellent water vapor permeability, excellent adhesion to skin with low skin irritation when applied, less adhesive residue after peeling, and less keratin damage. The adhesive does not cause wetness or peeling from sweat while being worn.

14 Claims, No Drawings

ADHESIVE COMPOSITION

CROSS REFERENCE TO RELATED APPLICATIONS

This application is a national stage filing under 35 U.S.C. 371 of PCT/US2011/027114, filed Mar. 4, 2011, which claims priority to Japanese Application No. 2010-048605, filed Mar. 5, 2010, the disclosures of which are incorporated by reference in their entirety herein.

TECHNICAL FIELD

The present disclosure relates to an adhesive composition containing acrylic adhesive particles. Further the present disclosure relates to an adhesive patch comprising a support layer and an adhesive layer which comprises the adhesive composition.

BACKGROUND

Various adhesive patches are used to secure skin wound dressings and medical instruments to the skin. Normally, these adhesive patches are required to have reduced skin irritation due to the adhesive composition or wetness while being worn, or skin irritation due to adhesive remaining on the skin or to keratin peeling when peeling off the patch.

For example, U.S. Pat. No. 5,543,151 discloses a cross-linked acrylic gel-based medical adhesive containing between 30 and 100 parts of an organic liquid component as a plasticizer in 100 mass % of a solution polymerized polymer containing as main ingredients a (meth)acrylate ester with between 2 and 15 carbon atoms and a polar component containing a carboxyl group or a hydroxyl group as a medical adhesive that causes little physical irritation to the skin.

Japanese publication JP H9-324164A discloses an acrylic-based adhesive obtained by polymerizing a vinyl-based monomer containing as a main ingredient a (meth)acrylate ester of a branched alkyl alcohol with between 14 and 20 carbon atoms by irradiating ultraviolet light onto a photopolymeric liquid composition containing said vinyl based monomer and a photopolymer initiator.

PCT Publication WO96014094 discloses a bandage for wounds wherein an adhesive containing mutually adjacent solvent dispersible acrylate rubber elastic adhesive particles with an average diameter between 1 and 250 micrometers is applied to a substrate with good moisture permeability. This adhesive also contains a small amount of an uncross-linked water-soluble polymer as a suspension dispersion stabilizer in a water dispersed polymer primarily containing a (meth)acrylate alkyl ester with between 4 and 12 carbon atoms and a polar component containing a carboxyl group or lactam.

SUMMARY

The disclosed adhesive has excellent water vapor permeability, excellent adhesion to skin with low skin irritation when applied, less adhesive residue after peeling, and less keratin damage. The adhesive does not cause wetness or peeling from sweat while being worn.

In one embodiment, the adhesive composition comprises acrylic adhesive particles having an average diameter of 10 to 100 micrometers obtained by suspension polymerization of an acrylic monomer mixture which comprises a branched C14-22 alkyl group containing (meth)acrylate and a polar monomer, wherein an amount of the branched C14-22 alkyl group containing (meth)acrylate is 20 mass % to 99 mass % with respect to the total amount of the acrylic monomer mixture including the acrylic adhesive particles.

The present disclosure further provides an adhesive patch having a support layer and an adhesive layer which comprises the adhesive composition.

DETAILED DESCRIPTION OF THE INVENTION

In this specification, (meth)acrylate and (meth)acrylic represent either acrylate or methacrylate and acrylic or methacrylic, and acrylic-based is a concept that includes both acrylic-based and methacrylic-based.

The present disclosure relates to an adhesive composition containing a cross-linked water absorbing polymer and acrylic adhesive particles having an average diameter of 10 to 100 micrometers, obtained by suspension polymerization of an acrylic monomer mixture.

The acrylic adhesive particles of the present disclosure are obtained by suspension polymerization of an acrylic monomer mixture, and have an average diameter between 10 and 100 micrometers when measured by the light scattering method. The average diameter can be measured as the volumetric average diameter using a particle distribution analyzer LS 13 320 (manufactured by Beckman Coulter). The acrylic adhesive particles may be solid or hollow.

The average particle diameter of the adhesive particles is not limited, but can be, for example, about 10 micrometers to about 100 micrometers. When the average particle diameter exceeds about 100 micrometers, the surface of the adhesive becomes rough and it is unlikely to obtain enough contact area to adhere. Therefore it tends to peel off easily after adhesion for a long time. When the average particle diameter is less than about 10 micrometers, then the surface of the adhesive becomes flat, and the contact area to the skin increases, and cutaneous irritation by peeling tends to be high.

The adhesive particles obtained by suspension polymerization of a monomer mixture containing a crosslinking agent are cross-linked within the particles or between particles (inter-particle). The effect of the present disclosure can be demonstrated with either type of crosslinking condition. The effect on adhesive residue will be particularly demonstrated if the particles are cross-linked together, and there will be almost no adhesive residue.

These acrylic adhesive particles are obtained by suspension polymerization of the aforementioned acrylic monomer mixture. For example, ion-exchanged water and a surfactant are added and mixed in a reactor, and then acrylic monomer, polymerization initiator, and a crosslinking agent (if desired) are added, then heated, mixed, and cooled under an inert gas such as nitrogen.

When performing the suspension polymerization, the average diameter of the acrylic adhesive particles can be adjusted by adjusting the polymerization conditions. "Polymerization conditions" refers in general to the mixing speed, reactor volume, baffle plate, and shape and number of mixing blades, and fine particles with the desired average diameter can be obtained by selecting these as appropriate ("Polymer Particle Diameter Control in Suspension Polymerization", Masahito Tanaka, published by IPC Co. Ltd. on Jun. 20, 1993).

The acrylic monomer mixture contains about 20 mass % to about 99 mass % of (meth)acrylate having a branched C14-22 alkyl group with respect to the total amount of the acrylic monomer mixture. Alternatively, the amount of the (meth)acrylate having a branched C14-22 alkyl group may be preferably from about 20 mass % to about 60 mass %. By having a (meth)acrylate containing a branched C14-22 alkyl group the adhesive composition will be soft, will have wetting properties towards skin and an appropriate level of adhesion maintenance, and the stress applied on the surface of the skin during peeling is mitigated, so keratin damage during peeling can be reduced.

Examples of (meth)acrylates having a branched C14-22 alkyl group include isomyristyl(meth)acrylate, isopentadecyl (meth)acrylate, isoheptadecyl(meth)acrylate, isocetyl(meth) acrylate, isostearyl(meth)acrylate, isononadecyl(meth)acrylate, 2-decyldecyl(meth)acrylate, and 2-decyldodecyl(meth) acrylate. These may be used alone or in combination with two or more thereof.

The acrylic monomer mixture also includes a polar monomer. By containing a small amount of polar monomer, the cohesive strength of the adhesive composition is increased, and thus the adhesive residue can be reduced when peeling off from the skin.

The polar monomer is not limited to, but can be a conventionally known polar monomer, for example, polar monomers containing an amide group such as acrylamide and N-vinylpyrrolidone (NVP); polar monomers containing a hydroxyl group such as hydroxyethylmethacrylate (HEMA), hydroxyethylacrylate (HEA), hydroxypropyl(meth)acrylate, and hydroxybutyl(meth)acrylate; and polar monomers containing a carboxyl group such as acrylic acid (AA), and methacrylic acid (MAA), and the like. Of these, polar monomers containing a hydroxyl group and polar monomers containing a carboxyl group can be preferably used.

The amount of polar monomer in the acrylic monomer mixture is not limited to, but may be for example about 1 mass % or higher. If a polar monomer containing a hydroxyl group is used, the amount can be between about 1 mass % or more and less than 10 mass %, between about 1 mass % and about 8 mass %, or between about 1 mass % and about 6 mass %. If the amount exceeds 10 mass %, adhesion to the skin may tend to worsen. Furthermore, if a polar monomer containing a carboxyl group is used, the amount is preferably between about 0.1 mass % or more and less than about 4 mass %, because the adhesion of the adhesive composition easily increases.

The adhesive of the present disclosure may further include a water-absorbing polymer. In this specification, the term "water-absorbing polymer" refers to a "highly water absorbent resin" as specified by JIS; i.e. a resin that is highly water absorbent, with a hydrophilic crosslinked structure, that absorbs water upon coming in contact with it, and will not easily release water so absorbed even under application of pressure. Alternatively, the term water-absorbing polymer identifies a polymer that has the capability to absorb 10 times or more its own weight in water. The water absorbing capability of the polymer can be measured using a water absorption test method for a water absorbing resin according to JIS K7223, or by the water absorption speed test method for a water absorbing resin according to JIS K7224.

Either cross-linked water-absorbing polymer or not cross-linked water-absorbing polymer may be used as the water-absorbing polymer. The crosslinked water-absorbing polymer can be a pre-crosslinked particulate water-absorbing polymer, or a un-crosslinked water-absorbing polymer that is later cross-linked.

If a un-crosslinked water-absorbing polymer is used, the un-crosslinked water-absorbing polymer is added to the products obtained from suspension polymerization of the acrylic monomer mixture, then crosslinked.

The un-crosslinked water-absorbing polymer includes, for example, polyethylene glycol and alkyl esters thereof, polypropylene glycol, polyvinylpyrrolidone (PVP), polyvinyl alcohol, CMC and salts thereof, poly acrylic acid and salts thereof, methylcellulose (MC), hydroxypropyl cellulose (HPC), hydroxyethyl cellulose (HEC), hydroxypropyl methylcellulose (HPMC), and other low-level alkyl esters of cellulose, as well as poly glycerin and alkyl esters thereof. When the un-crosslinked water-absorbing polymer is cross-linked, a three-dimensional crosslink can be formed using the cross-linking agent that is reactive towards the hydroxyl groups and the carboxyl groups in the water absorbent polymer. Examples of these crosslinking agents include aldehyde compounds, acetal compounds, epoxy compounds, polycarboxylic acids, and alkali earth metal salts and the like.

If the un-crosslinked water-absorbing polymer is used, the water-absorbent polymer will be uniformly adhered to the surface of the adhesive particles after applying the adhesive composition to a substrate and drying. Therefore, the amount of the un-crosslinked water-absorbing polymer may be preferably about 0.1 mass % to about 3 mass % with respect to the acrylic adhesive particles. When the amount of the acrylic adhesive particles exceeds about 3 mass %, more amount of the water-absorbing polymer adheres to the surface of the adhesive particles, then the adhesion will be lower and easier to peel off after prolonged application.

The crosslinked water-absorbing polymer is localized, therefore it is not likely to adhere to the surface of the adhesive particles and the surface of the adhesive particles can be kept exposed. Therefore, the crosslinked water-absorbing polymer can be added more than the un-crosslinked water-absorbing polymer without reducing the adhesion of the adhesive particles. The crosslinked water-absorbing polymer can be added about 0.1 mass % or more and less than about 10 mass % with respect to the acrylic adhesive particles. When the amount of the crosslinked water-absorbing polymer exceeds about 10 mass %, the adhesion is likely to reduce, and easy to peel off after prolonged application.

The amount of the crosslinked water-absorbing polymer is not limited to, but may be, for example, greater than or equal to about 0.1 mass % but less than about 10 mass % with respect to the mass of the acrylic adhesive particles.

The acrylic monomer mixture may further contain a C1-12 alkyl group-containing (meth)acrylate. The C1-12 alkyl group can be straight, branched, or cyclic. Examples of these (meth)acrylates include methyl methacrylate, ethyl (meth) acrylate, n-butyl (meth)acrylate, isoamyl(meth)acrylate, n-hexyl (meth)acrylate, 2-ethylhexyl(meth)acrylate, isooctyl (meth)acrylate, isononyl(meth)acrylate, decyl(meth)acrylate, lauryl(meth)acrylate, and cyclohexyl(meth)acrylate and the like. Of these, (meth)acrylates having a straight or branched C1-12 alkyl group such as 2-ethylhexyl acrylate, isooctyl acrylate, n-butyl acrylate, and lauryl acrylate and the like are preferable.

The amount of the straight or branched C1-12 alkyl group-containing (meth)acrylate in the acrylic monomer mixture, is not limited to, may be for example, between 0 to about 79 mass %.

The acrylic monomer mixture may further contain a crosslinking agent. The crosslinking agent includes multifunctional (meth)acrylate containing not less than two (meth) acrylates. Specific examples include 1,4-butanediol di(meth) acrylate, 1,6-hexanediol di(meth)acrylate, (meth)acrylate esters of triols (such as glycerol and the like), and (meth) acrylate esters of tetrols (such as pentaerythritol and the like).

The amount of the crosslinking agent in the acrylic monomer mixture is not limited to, but may be for example, between about 0.01 to about 0.5 mass % with respect to the mass of the acrylic monomer mixture. If the amount of crosslinking agent is too small, the adhesive composition will not have sufficient cohesion, and adhesive residue may remain on the skin, but conversely if the amount of crosslinking agent is excessive, the cohesion will be too strong and the desired skin adhesion will not be achieved.

The adhesive composition of the present disclosure can be manufactured as described above, by suspension polymerizing the acrylic monomer mixture, forming the acrylic adhesive particles, then adding a crosslinked or un-crosslinked water-absorbing polymer and mixing, adjusting the viscosity, adding additives if required, applying to a substrate, and drying. Furthermore, a conventionally known epoxy, isocyanate, or aziridine cross-linking agent can be added, applied to a substrate, dried, and then crosslinked. Furthermore, by using a photo crosslinking agent such as benzophenone or the like, crosslinking can be performed using ultraviolet light or the like after applying and drying. Here, copolymerizing a photo-crosslinking agent such as acryloyl benzophenone or the like in the adhesive particles in advance will enable more efficient photo-crosslinking. Alternatively, crosslinking between the acrylic adhesive particles can be performed by using a physical means such as electron beam irradiation or gamma beam irradiation. Note that if an un-crosslinked water absorbing polymer is used, crosslinking must be performed after blending with the acrylic adhesive particles.

The adhesive composition of the present disclosure may further contain commonly used additives as necessary, such as surfactants, dispersion stabilizers, and polymerization initiators and the like.

Examples of surfactants include anionic surfactants such as alkyl sulfate esters, alkyl benzene sulfonate salts, and polyoxyethylene alkyl phosphate esters; nonionic surfactants such as polyoxyethylene alkyl ethers, sorbitrate and fatty acid esters, and polyoxyethylene sorbitan fatty acid esters; cationic surfactants such as alkyl amine salts, and quaternary ammonium salts; and hydrophilic polymers such as polyvinyl alcohols, polyethylene glycol, and polypropylene glycol and the like.

Examples of dispersion stabilizers include ammonium polyacrylate, sodium polyacrylate, lithium polyacrylate, potassium polyacrylate, and other neutral poly-carboxylic acids containing a polyacrylate salt with a molecular weight exceeding about 5000; acrylamides, particularly carboxy modified polyacrylamides; copolymers of acrylic acid and dimethylamino ethyl methacrylate; quaternary amines such as quaternary amine substituted cellulose derivatives; cross-linked polyvinyl alcohols; carboxy modified cellulose derivatives such as sodium carboxymethylcellulose; as well as hydrophilic ethers, polyoxyethylene alkyl ethers, polyoxyethylene alkyl esters, sorbitan fatty acid esters, polyoxyethylene sorbitan fatty acid esters, and other esters.

The polymerization initiators include organic peroxides such as benzoyl peroxide, lauroyl peroxide or bis(4-tertiary butylcyclohexyl) peroxydicarbonate; or azo-based polymerization initiators such as 2,2'-azobisisobutyronitrile, 2,2'-azobis-2-methylbutyronitrile, 4,4'-azobis-4-cyanovalerianate, dimethyl 2,2'-azobis(2-methylpropionate) or azobis-2,4-dimethylvaleronitrile (AVN); or the like. The amount of the polymerization initiator may be between 0.05 and 5 mass parts in 100 mass parts of the monomer mixture.

The adhesive composition of the present disclosure may further contain various commonly used additives so long as skin irritation does not result. Examples of additives include thickening agents (rheology modifiers), plasticizers, antioxidants, moisture retaining agents, and medicaments containing an effective ingredient. The medicaments added can be medicaments for treating wounds, for local administration, or for systemic administration or the like.

The adhesive patch of the present disclosure includes a support layer and an adhesive layer consisting of the adhesive composition of the present disclosure. The adhesive patch can be obtained by applying and drying the adhesive composition onto a support layer of a conventionally used substrate, or by laminating an adhesive layer formed by first applying and drying the adhesive composition onto a different substrate onto the support layer.

The support layer is not limited to, but for example, includes known flexible materials usually used for adhesive patches such as a medical adhesive patch. Specific examples include polymer films such as polyester, polyolefin, or cellulose esters and the like; woven, knitted, or nonwoven fabrics made of polyester, polyolefin, cellulose esters, polyurethane, or polyamides; paper, washi (Japanese paper), laminate of washi and polymer film, washi obtained by impregnating or coating polymer solution, and drying, and the like.

Of these, substrates that have high water vapor permeability can be preferably used. Preferred 24-hour water vapor permeability (MVTR T24), as measured in accordance with ASTM E 96-80 at a humidity difference of 80% and 40° C., is about 500 $g/m^2$ or higher, preferably about 1000 $g/m^2$ or higher. Alternatively, a substrate made from a material disclosed in U.S. Pat. Nos. 3,645,835 and 4,595,001, or a nonwoven substrate made from the material disclosed in Published Japanese Translation of PCT Application No. 2003-503538. Besides, substrates that have good tensile strength (e.g. 1N/5 mm or more) and good elongation (e.g. elongation at rupture is 1% or more) can be preferable used. The substrates having elongation at rupture of 1% or more may provide flexibility to the skin. Therefore the patch is not easy to peel off from the skin while prolonged application.

In addition to the support layer and the adhesive layer, the adhesive patch can be laminated with known functional layers, such as liners and surface-protecting layers.

The fabric weight of the support layer can be selected from a range that does not negatively affect the water vapor permeability and skin following. It may be, for example, between about 20 $g/m^2$ and about 500 $g/m^2$ or about 20 $g/m^2$ and about 60 $g/m^2$.

The amount of adhesive layer applied can also be selected from a range that does not negatively affect water vapor permeability and skin following. It may be, for example, between about 10 $g/m^2$ and about 150 $g/m^2$ or about 10 $g/m^2$ and about 50 $g/m^2$.

The adhesive composition of the present disclosure has reduced skin irritation and minimal adhesive residue, and therefore can be used by applying to the skin at the location of treatment. If an adhesive layer comprising the adhesive composition of the present disclosure is laminated onto a support layer to form a patch, the patch can be used as a tape or a bandage for covering wounds, as a tape for securing a medical instrument to the skin or a supporter; or the like. Furthermore, if the adhesive layer includes a medicament, the adhesive can be used as a patch for a wound care, a patch for local administration or a patch for systemic administration depending on the type of medicament.

EXAMPLES

The components and average particle diameter of the adhesive compositions used in the examples and comparative examples of the present specification are shown in Table 1.

The details of the raw materials used in Table 1 are shown below.

LA: Lauryl acrylate (manufactured by Osaka Organic Chemical Industry Ltd.)

HEDA 16: 2-hexyldecyl acrylate (manufactured by TOHO Chemical Industry Co. Ltd.)
HEMA: hydroxyethyl methacrylate (Acrylic ester HISS manufactured by Mitsubishi Rayon Co. Ltd.)
2EHA: 2-ethylhexyl acrylate (manufactured by Nippon Shokubai Co. Ltd.)
AA: Acrylic acid (manufactured by To a Gosei Co. Ltd.)
HDDA: 1,6-hexanediol diacrylate (bifunctional crosslinking agent, Light Acrylate™ 1.6HX-A, manufactured by Kyoeisha Chemical Co. Ltd.)
AcDiSol: Crosslinked sodium carboxymethylcellulose particles (crosslinked water-absorbing Polymer particles, AcDiSol™ SD-711, manufactured by NCF Corp.)
SAP: Sodium polyacrylate (crosslinked water-absorbing polymer particles, Aqua-keep™ 10SH-NF, manufactured by Sumitomo Seika Chemicals Co. Ltd.)
EMANON™ 3299RV: polyethylene glycol distearate (dispersion stabilizer, EMANON™ 3299RV, manufactured by Kao Corp.)
TT615: polyacrylate salt (dispersion stabilizer, Primal™ TT-615, manufactured by Rohm and Haus)
Neopelex™ G-15: sodium dodecylbenzene sulfonate (surfactant, Neopelex™ G-15, manufactured by Kao Corp.)
V-601: dimethyl 2,2'-azobis(2-methylpropionate) (polymerization initiator, manufactured by Wako Pure Chemical Industries, Ltd.)

Preparation of the Adhesive Composition

Examples 1-15 and Comparative Examples 1, 3-5

115 mass parts of ion-exchanged water and 10 mass parts of a surfactant (Neopelex G-15, manufactured by Kao Corp.) were added to a separable flask equipped with a reflux condenser tube, thermometer, and nitrogen gas feeding device, and mixed until uniform. The acrylic monomer and cross-linking agent shown in Table 1 together with 0.2 mass parts of a polymerization initiator (V-601 manufactured by Wako Pure Chemical Industries, Ltd.) were added and mixed at 70° C. for 3 hours as nitrogen gas was introduced, then at 85° C. for another 2 hours to produce a suspension of the adhesive of the present disclosure with an average diameter between 10 and 100 micrometers and a solid fraction of 45%. After the suspension was cooled to room temperature, the water-absorbing agent and stabilizer shown in Table 1 were added, the viscosity was adjusted to an appropriate level for application.

For Examples 1-10, Comparative examples 1, 3-5, the solution was directly applied to a polyester rayon blended non-woven material (fabric weight between 50 and 60 g/m$^2$) and then dried, or applied to a silicone treated film, dried and then laminated onto the nonwoven material to fabricate a sample. For Examples 11-15, the solution was directly applied to washi impregnating acrylic resin or rubber resin (fabric weight between 40 and 50 g/m$^2$, water vapor permeability 500 to 1000 seconds/100 cc) and then dried to fabricate a sample. The amount of adhesive applied was 50 g/m$^2$ for Examples 1 to 4, 6 to 10, Comparative examples 1, 3 to 6, it was 40 g/m$^2$ for Example 5, and it was 30 g/m$^2$ for Examples 11 to 15.

Measurement Method for Tensile Strength and Elongation of Backings

The tensile strength and elongation were carried out in accordance with JIS K6251. Backing sample was punched out in the machine direction with dumbbell cutter, its shape was based on JIS K6251-3 (width:5 mm, thickness:10 to 100 micrometers). Tensile Strength was the maximum force applied to the test sample to obtain the tensile value at point of rupture or break. Elongation was the maximum percent of stretch reached by the test sample to the point of rupture or break. Tensile speed was 300 mm/minute, and gauge length was 50 mm.

Comparative Example 2

A monomer emulsion was obtained by emulsifying ion exchange water, an acrylic monomer, a crosslinking agent, and a surfactant (Neopelex G-15, manufactured by Kao Corp.) in a homogenizing mixer. The monomer emulsion and a polymerization initiator (V-601, manufactured by Wako Pure Chemical Industries, Ltd.) were placed in a reaction vessel and nitrogen gas substitution was performed, followed by heating and mixing at 65° C. for 24 hours to obtain a suspension of an adhesive with an average particle diameter of 2 micrometers. After the suspension was cooled to room temperature, the water-absorbing agent and thickening agent shown in Table 1 were added, the viscosity was adjusted to an appropriate level for application, and then the solution was applied to a silicone treated film, dried, and then laminated onto a nonwoven material to form a sample with an adhesive application rate of 30 g/m$^2$.

TABLE 1

| | Acrylic monomer mixture | | | | | Cross-linking agent | | Water absorbing polymer | | | Stabilizer | |
|---|---|---|---|---|---|---|---|---|---|---|---|---|
| | LA | HEDA16 | 2EHA | HEMA | AA | ABP | HDDA | AcDiSol | Gelycel | SAP | EMANON 3299RV | TT615 |
| Ex 1 | 60 | 35 | | 5 | | | 0.04 | 4.5 | | | 1.5 | |
| Ex 2 | 60 | 35 | | 5 | | | 0.04 | 4.5 | | | | 0.5 |
| Ex 3 | 60 | 35 | | 5 | | | 0.04 | | | 1.1 | | |
| Ex 4 | 45 | 50 | | 5 | | | 0.04 | 4.5 | | | | 0.5 |
| Ex 5 | | 50 | 45 | 5 | | | 0.04 | 4.5 | | | | 0.5 |
| Ex 6 | 60 | 36 | | 3 | 1 | | 0.04 | | | 1.6 | | |
| Ex 7 | 61.5 | 35 | | | 3.5 | | 0.04 | 4.5 | | | 1.5 | |
| Ex 8 | 60 | 35 | | 5 | | 0.03 | 0.02 | | | 1.1 | | |
| Ex 9 | 60 | 35 | | 5 | | 0.05 | | 4.5 | | | | 0.5 |
| Ex 10 | 60 | 35 | | 5 | | | 0.04 | | | 1.1 | | |
| Ex 11 | 60 | 35 | | 5 | | | 0.04 | 0.14 | | | | 0.07 |
| Ex 12 | 60 | 35 | | 5 | | | 0.04 | | | 1.1 | | |
| Ex 13 | 60 | 35 | | 5 | | | 0.04 | | 1.6 | | | |

TABLE 1-continued

| | Acrylic monomer mixture | | | | | Cross-linking agent | | Water absorbing polymer | | | Stabilizer EMANON | |
|---|---|---|---|---|---|---|---|---|---|---|---|---|
| | LA | HEDA16 | 2EHA | HEMA | AA | ABP | HDDA | AcDiSol | Gelycel | SAP | 3299RV | TT615 |
| Ex 14 | 60 | 35 | | 5 | | | 0.04 | | | | | 0.8 |
| Ex 15 | 60 | 35 | | 5 | | | 0.04 | 2.2 | 0.45 | | | |
| CEx 1 | 80 | 15 | | 5 | | | 0.04 | 4.5 | | | | 0.5 |
| CEx 2 | 60 | 30 | | 10 | | | 0.06 | 4.5 | | | | 0.5 |
| CEx 3 | 60 | 35 | | 5 | | | 0.06 | 4.5 | | | | 0.5 |
| CEx 4 | 60 | 35 | | 5 | | | 0.04 | 12 | | | | |
| CEx 5 | 60 | 35 | | 5 | | | 0.04 | | 4 | | | |

Measurement of the Particle Diameter Distribution of the Adhesive

For the suspension polymerized by the above method, the volumetric average particle diameter of the adhesive composition was measured using a particle distribution analyzer LS 13 320 (manufactured by Beckman Coulter). The results are presented in Table 2.

Water Vapor Permeability Test

The samples produced for the examples and comparative examples were evaluated for water vapor permeability in accordance with the A-2 water method of JIS L1099 (Water Vapor Permeability Test Method for Fiber Products). The test sample was placed over a cup filled with ion exchange water, and the water vapor permeability of the test sample was calculated by the change in weight of the whole cup after sitting in an environment at 37° C. and 50% relative humidity. Water vapor permeability of 500 g/m$^2$/24 hr or higher is considered favorable. The results are presented in Tables 3, 4 and 6.

Skin Adhesion Test

Adhesive tapes according to the examples of the present disclosure and the comparative examples were applied to the back of six healthy volunteers and evaluated for the adhesive properties of 1) through 5) shown below. The results are shown in Tables 3-6.

1) Skin Adhesion

Three samples of each example were cut to a width of 25 mm and contact bonded to the back of six healthy volunteers using a 2 kg weight roller moving back and forth one revolution, one sample was peeled off after 10 minutes (hereinafter designated as T0), after 4 hours (designated as T4), and after 24 hours (designated as T24) at an angle of 180 degrees at a speed of 15 cm/minute, and the adhesion at this time was recorded and an average value was calculated.

2) Holding Power (Tape Loosening after a Fixed Period of Time)

Using the samples for the aforementioned skin adhesion tests, the amount of loosening of the sample was recorded at T0, T4, and T24. The surface area of those portions of the sample that were unattached to the skin was visually calculated and evaluated on a scale of 0 to 5 wherein 0 indicates no looseness and 5 indicates separation from the skin, then the average value was calculated.

3) Adhesive Residue

The samples of the above skin adhesion test were peeled off, then tissue paper was brought into contact with the areas where the tape was applied and the adhesive residue remaining on the skin was calculated in terms of area. The adhesive residue was evaluated on a scale of 0 to 5 wherein 0 indicates absolutely no adhesive residue and 5 indicates adhesive residue in the entire area of application, then the average value was calculated.

4) Skin Irritation (Skin Redness after Peeling Off)

Skin redness was evaluated immediately after and 10 minutes after peeling off the samples of the above skin adhesion test. The regions where redness was observed were visually compared for the degree and area of the redness and evaluated on a scale of 0 to 5 wherein 0 indicates no redness and 5 indicates vivid redness over the entire area of application, then the average value was calculated.

5) Keratin Damage when Peeling Off (Keratin Removal)

In the above skin adhesion test, a random point on the surface where the sample that was peeled off after 4 hours was applied (T4) was analyzed using an infrared transmissivity analyzer (ATR method). The light absorption was measured at a frequency that keratin is known to absorb in (protein) (1539 cm-1, 1630 cm-1) with the absorbance when actual skin was measured being considered 100% and the absorbance of the adhesive alone when not applied to the skin being considered 0%, the absorbance of keratin that adhered to the surface of the adhesive was recorded as a percentage, then the average value was calculated.

TABLE 2

| | Particle size [μm] |
|---|---|
| Ex 1 | 48 |
| Ex 2 | 46 |
| Ex 3 | 35 |
| Ex 4 | 39 |
| Ex 5 | 40 |
| Ex 6 | 42 |
| Ex 7 | 41 |
| Ex 8 | 35 |
| Ex 9 | 36 |
| Ex 10 | 25 |
| Ex 11 | 22 |
| Ex 12 | 35 |
| Ex 13 | 22 |
| Ex 14 | 22 |
| Ex 15 | 34 |
| CEx 1 | 37 |
| CEx 2 | 48 |
| CEx 3 | 2 |
| CEx 4 | 46 |
| CEx 5 | 39 |

TABLE 3

| | MVTR [g/m2 · 24 h] | Skin Adhesion [g/25 mm] | | | Holding Power [Score] | | Adhesive Residue [Score] | | Skin Redness [Score] | | Keratin removal [%] |
|---|---|---|---|---|---|---|---|---|---|---|---|
| | | T0 | T4 | T24 | T4 | T24 | T4 | T24 | T4 | T24 | T4 |
| Ex 1 | 1303 | 45 | 89 | 99 | 0.8 | 2 | 1.5 | 2.6 | 0.5 | 1.2 | 3.1 |
| Ex 2 | 1170 | 33 | 58 | 75 | 1 | 2 | 0.5 | 1 | 0 | 1 | 1.9 |
| Ex 3 | 989 | 44 | 82 | 94 | 0.9 | 1.8 | 0.5 | 0.9 | 0.8 | 0.5 | 2.5 |
| Ex 4 | 1085 | 26 | 71 | 71 | 1.7 | 1.2 | 1 | 1.3 | 0.3 | 1.2 | 1.5 |
| Ex 5 | 942 | 33 | 93 | 68 | 1.7 | 1.2 | 0.2 | 1.2 | 0.3 | 0.7 | 2.7 |
| Ex 6 | 1087 | 43 | 58 | 71 | 1.7 | 2.8 | 0.4 | 0.9 | 0.3 | 0.5 | 0.6 |
| Ex 7 | 1076 | 39 | 71 | 107 | 0.8 | 1.2 | 0.2 | 0.8 | 0.4 | 1.3 | 3.4 |
| Ex 8 | 656 | 41 | 53 | 76 | 1.2 | 1.9 | 0.2 | 0.2 | 0.2 | 1 | 1.6 |
| Ex 9 | 590 | 34 | 70 | 70 | 0.7 | 1 | 0 | 0 | 0.6 | 0.6 | 1.6 |
| CEx 1 | 994 | 33 | 74 | 57 | 1.3 | 1.5 | 0.2 | 0.8 | 0.3 | 1 | 12.4 |
| CEx 2 | 1279 | 25 | 47 | 81 | 3 | 3.7 | 0.3 | 0 | 0.3 | 2.3 | 2.5 |

TABLE 4

| | Particle Size [um] | MVTR [g/m2 · 24 h] | Skin Adhesion [g/25 mm] | | | Keratin Removal [%] |
|---|---|---|---|---|---|---|
| | | | T0 | T4 | T24 | T4 |
| Ex 2 | 46 | 1170 | 33 | 58 | 75 | 1.9 |
| Ex 3 | 35 | 989 | 44 | 82 | 94 | 2.5 |
| Ex 10 | 25 | 780 | 36 | 54 | 70 | 3.1 |
| C Ex 3 | 2 | 470 | 29 | 61 | 45 | 4.4 |

TABLE 5

| | Backing description | | | | PSA | Skin Adhesion [g/25 mm] | | | Ketratin Removal [%] |
|---|---|---|---|---|---|---|---|---|---|
| | Type | Basis Weight [g/m²] | Tensile Strength [N/5 mm] | Elongation [%] | coating weight [g/m²] | T0 | T4 | T24 | T4 |
| Ex 3 | Nonwoven | 58 | 9.13 | 12.8 | 50 | 44 | 82 | 94 | 2.5 |
| Ex 11 | Paper | 51 | 13.75 | 3.96 | 30 | 47 | 78 | 88 | 2.2 |
| Ex 12 | Paper | 45 | 14.2 | 2.16 | 30 | 49 | 83 | 103 | 2.1 |
| Ex 13 | Paper | 42 | 12.71 | 3.31 | 30 | 32 | 78 | 76 | 2.3 |
| Ex 15 | Paper | 41 | 14.04 | 2.92 | 30 | 42 | 66 | 73 | 0.9 |

TABLE 6

| | MVTR [g/m2 · 24 h] | Type of backing | Skin Adhesion [g/25 mm] | | | Keratin Removal [%] |
|---|---|---|---|---|---|---|
| | | | T0 | T4 | T24 | T4 |
| Ex 3 | 989 | Nonwoven | 44 | 82 | — | 2.5 |
| Ex 11 | — | Paper | 47 | 78 | — | 2.2 |
| Ex 12 | 828 | Paper | 49 | 83 | — | 2.1 |
| Ex 13 | — | Paper | 32 | 78 | — | 2.3 |
| Ex 14 | — | Paper | 66 | 83 | — | — |
| Ex 15 | — | Paper | 42 | 66 | — | 0.9 |
| CEx 4 | 1686 | Nonwoven | 25 | 35 | — | 3.7 |
| CEx 5 | 900 | Nonwoven | 14 | 31 | — | — |

What is claimed is:

1. An adhesive composition comprising acrylic adhesive particles having an average diameter of 10 to 100 micrometers obtained by suspension polymerization of an acrylic monomer mixture which comprises a branched C14-22 alkyl group containing (meth) acrylate and a polar monomer,
wherein an amount of the branched C14-22 alkyl group containing (meth) acrylate is 20 mass % to 99 mass % with respect to the total amount of the acrylic monomer mixture including the acrylic adhesive particles.

2. The adhesive composition according to claim 1 further comprising a water-absorbing polymer.

3. The adhesive composition according to claim 2, wherein water-absorbing polymer is a cross-linked water-absorbing polymer.

4. The adhesive composition according to claim 2, wherein water-absorbing polymer is particulate.

5. The adhesive composition according to claim 1 further comprising a C1-12 alkyl group containing (meth) acrylate.

6. The adhesive composition according to claim 1, wherein the polar monomer is a hydroxyl group containing monomer.

7. The adhesive composition according to claim 6, wherein an amount of the hydroxyl group containing monomer is 1 mass % to 10 mass % with respect to the total amount of the acrylic monomer mixture including the acrylic adhesive particles.

8. The adhesive composition according to claim 1, wherein the polar monomer is a carboxylic group containing monomer.

9. The adhesive composition according to claim 8, wherein an amount of the carboxylic group containing monomer is not less than 0.1 mass % and less than 4 mass % with respect to the total amount of the acrylic monomer mixture including the acrylic adhesive particles.

10. The adhesive composition according to claim 2, wherein an amount of the cross-linked water-absorbing polymer is 0.1 mass % to 10 mass % with respect to the acrylic adhesive particles.

11. A adhesive patch comprising a support layer and an adhesive layer which comprises the adhesive composition according to claim 1.

12. The adhesive patch according to claim 11, wherein the support layer comprises nonwoven web.

13. The adhesive patch according to claim 12, wherein the nonwoven web has a basis weight from 20 g/m² to 500 g/m².

14. The adhesive patch according to claim 12, wherein the nonwoven web has water vapor permeability (MVTR T24) of 500 g/m² or more.

* * * * *